(12) United States Patent
Laeuffer

(10) Patent No.: US 6,324,080 B1
(45) Date of Patent: *Nov. 27, 2001

(54) METHOD AND APPARATUS FOR ENERGY CONVERSION UTILIZING CIRCUIT PHASE AND TIME VARIABLES

(75) Inventor: Jacques Laeuffer, Paris (FR)

(73) Assignee: GE Medical Systems, S.A. (FR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/149,644

(22) Filed: Sep. 8, 1998

(Under 37 CFR 1.47)

(30) Foreign Application Priority Data

Sep. 10, 1997 (FR) .................................. 97 11243

(51) Int. Cl.$^7$ .................................. H02M 3/335
(52) U.S. Cl. .................. 363/25; 363/98; 363/132; 363/133

(58) Field of Search ................... 363/15, 16, 17, 363/24, 25, 98, 132, 133; 323/911

(56) References Cited

U.S. PATENT DOCUMENTS

| | | | |
|---|---|---|---|
| 4,758,940 | * | 7/1988 | Steigerwald .................. 363/98 |
| 5,032,972 | * | 7/1991 | Erckert ....................... 363/17 |
| 5,267,138 | * | 11/1993 | Shores ....................... 363/98 |
| 5,504,668 | * | 4/1996 | Beyerlein et al. ............. 363/17 |
| 5,642,268 | * | 6/1997 | Pratt et al. .................. 363/17 |
| 5,684,678 | * | 11/1997 | Barrett ....................... 363/17 |

* cited by examiner

Primary Examiner—Peter S. Wong
Assistant Examiner—Gary L Laxton
(74) Attorney, Agent, or Firm—Jay L. Chaskin

(57) ABSTRACT

A conversion apparatus having transistors, comprising means for inverting a DC voltage in order to obtain an AC voltage, means for filtering the AC voltage, including at least one parallel inductor $L_p$, the device being capable of operating above a resonant frequency $F_p$. The conversion apparatus comprises means for predicting a zero crossing of the instantaneous current $I_{1p}$ in the parallel inductor $L_p$, and means for causing a transistor of the device to switch if a zero crossing of the current $I_{1p}$ is predicted.

16 Claims, 5 Drawing Sheets

US 6,324,080 B1

METHOD AND APPARATUS FOR ENERGY CONVERSION UTILIZING CIRCUIT PHASE AND TIME VARIABLES

BACKGROUND OF THE INVENTION

The present invention relates to the field of DC/AC conversion of electrical energy.

Inverters are supplied with a DC voltage and deliver as output an AC voltage by virtue of one or more transistor half-bridges. The output AC voltage is generally subjected to filtering.

Inverters of this type are, amongst other things, used for the electrical power supply of an X-ray tube.

An X-ray tube mounted, for example, in a medical radiology instrument, comprises a cathode and an anode which are both enclosed in an evacuated leaktight casing, so as to produce electrical insulation between these two electrodes. The cathode produces an electron beam which is received by the anode on a small surface constituting a focus from which the X-rays are emitted.

When a high supply voltage is applied using a generator to the terminals of the cathode and the anode, so that the cathode is at a negative potential V and the anode is at a positive potential +V, with respect to the potential of the cathode, a so-called anodic current is set up in the circuit through the generator which produces the high supply voltage. The anodic current passes through the space between the cathode and the anode in the form of an electron beam which bombards the focus.

The anode is in the shape of a flat disc which is supported by a shaft, driven in rotation by a rotor of an electric motor, the stator of which is arranged outside the casing, with the aim of promoting the dissipation of the energy. The X-ray tube is arranged in an enclosure filled with an insulating refrigerant.

The characteristics of the X-rays which are emitted by the tube, in particular their hardness, depend on a number of parameters, including the value of the high voltage applied to the electrodes. This high voltage should be adjustable in order to obtain the desired characteristics, and should remain constant throughout the radiological exposure time, so as not to alter the operating characteristics of an X-ray receiver which receives the X-rays which have passed through the object which is undergoing examination.

X-ray tubes for medical diagnosis operate in pulses. It is therefore important for the time taken to establish the high voltage, as well as the time taken to return from this high voltage to a zero value, to be as short as possible.

A high-voltage generator for an X-ray tube generally comprises a supply circuit which delivers a DC voltage E starting with an AC voltage delivered by the mains. The voltage E is applied to the terminals of an inverter of the type which comprises at least one transistor half-bridge, each branch of the half-bridge comprising a switch S consisting of a transistor T and a freewheeling diode D mounted in antiparallel. The AC signal delivered by the inverter is applied, via a filter, to the primary of a step-up voltage transformer having a turns ratio k. The secondary of the step-up voltage transformer is connected to a rectifying and filtering circuit comprising at least one diode halfbridge and capacitors $C_f$ for filtering the voltage.

In known fashion, the inverter comprises a transistor pair connected in series to the output terminals of the supply circuit. A freewheeling diode D is connected between the collector and the emitter of each transistor T, so that its anode is connected to the emitter of the corresponding transistor. The bases of the transistors are connected to a control circuit which delivers switching signals for the transistors. In the case of a single half-bridge, the two output terminals of the inverter consist of the common point of the two branches of the half-bridge and of a point common to two capacitors of the half-bridges which are mounted in parallel and, in the case of two half-bridges, of each point common to the two transistors of a half-bridge.

The output filter of the inverter comprises, for example, a coil $L_r$ and a capacitor $C_r$ which are arranged in series, and a coil $L_p$ which is arranged in parallel with the capacitor $C_r$. One of the terminals of the filter is connected to an output terminal of the inverter, and the other terminal is connected to a terminal of the primary circuit of the transformer.

The rectifying circuit connected to the secondary of the step-up voltage transformer consists, for example, of a two-diode bridge, the point common to the two diodes being connected to one of the output terminals of the secondary of the transformer, two capacitors $C_{f1}$ and $C_{f2}$ being arranged in parallel with the diode bridge, the other terminal of the secondary of the transformer being connected to the point common to the two capacitors $C_{f1}$ and $C_{f2}$.

The control circuit essentially comprises a comparator, a circuit for measuring the current $I_{1r}$ at the primary of the transformer, and a circuit for developing the switching signals for the transistors of the inverter. One of the two output terminals of the comparator is connected to the common point of two resistors of a voltage divider, to which the DC supply voltage $V_{cf}$ of the X-ray tube is applied, and the other is connected to a reference voltage source. The output terminal of the comparator delivers a signal whose amplitude is proportional to the difference between the two voltages applied to the input terminals, and it is connected to an input terminal of the circuit for developing the switching signals, so as to bring about a change in the frequency of the control signals for the transistors. The output terminal of the circuit for measuring the current in the primary of the transformer is connected to another input terminal of the circuit for developing the switching signals, with the aim of detecting and avoiding certain malfunctions of the inverter.

In conventional fashion, the control variable on which the control circuit acts is the time period $T_d$ until the transistors are turned on, starting from the instant when the current of the inverter reaches a zero value.

The presence of a filter with double resonance makes it possible to have the current of the inverter change as a monotonically increasing function of frequency, between the parallel resonant frequency and the series resonant frequency, the values of which depend on the values of the capacitor $C_r$ of the series coil $L_r$ and of the parallel coil $L_p$ of the filter. It therefore seems possible to control the power transmitted to the X-ray tube by the operating frequency of the inverter, and consequently the activation delay $T_d$. However, it can also be seen that, if operation is below the parallel resonant frequency $F_p$, the value of the current of the inverter is a monotonically decreasing function of frequency, which may cause an error in the regulation.

BRIEF DESCRIPTION OF THE INVENTION

It is therefore desirable to overcome this drawback, by ensuring that the inverter remains at an operating frequency above the parallel resonant frequency $F_p$, the value of which may vary from one instrument to another in of the order of plus or minus 5%, because of the variation in the values of the capacitor and of the coils of the filter.

It is a further desire to provide an inverter which operates satisfactorily under no load and under weak load.

It is a further desire to provide a method of operation of a conversion device, ensuring that the inverter remains at an operating frequency above the parallel resonant frequency $F_p$.

The reason for this is that when, starting from operation under no load, there is an increase in the power transmitted to the load, consisting of the transformer, the amplitude of the current flowing through the transistors increases, while the amplitude of the current flowing through the associated diodes decreases. Under no load, the current $I_{1r}$ being equal to the current flowing through the primary of the transformer, the first harmonic of the current $I_{1r}$ flowing through the series inductor $L_r$ crosses zero at the same time as the current $_{1r}$ itself. When the load is increased, the first harmonic of the current $I_{1r}$ becomes shifted with respect to the current $I_{1r}$ and crosses zero later, during the conduction time of the diode. The result of this is that the first harmonic of the current $I_{1p}$ flowing in the parallel inductor $L_p$, which is in phase opposition with the first harmonic of the current $I_{1r}$, also crosses zero within the conduction time of the diode. However, $I_{1p}$ is quasi-sinusoidal. $I_{1p}$ therefore crosses zero during the conduction time of the diode, that is to say after $I_{1r}$.

Furthermore, the voltage $V_{1p}$ across the terminals of the parallel inductor leads by 90° with respect to $I_p$, and the current $I_{cr}$ flowing into the capacitor leads by 90° with respect to the voltage across the terminals of the capacitor. $I_{1p}$ and $I_{cr}$ are therefore 180° out of phase. The first harmonic of $I_{1r}$ is equal to the sum of the first harmonic of $I_{cr}$ and the first harmonic of $I_{1p}$, which cross zero at the same time, and the amplitude of $I_{cr}$ is greater than that of $I_{1p}$. The result of this is that $I_{1r}$ has the harmonic of $I_{1r}$ is harmonic of $I_{1p}$.

In steady state, and when the power is transmitted to the load consisting of the transformer, the situation should therefore be that $I_{1r}$ crosses zero before $I_{1p}$. In the converse case, if $I_{1r}$ crosses zero after $I_{1p}$, the inverter will be in an abnormal operating state. Since the output of the transformer is connected to a diode bridge, the energy conversion assembly is not reversible, and the transformer cannot therefore deliver energy to the inverter. Thus, if the transistors are controlled in such a way that $I_{1r}$ crosses zero after $I_{1p}$, the conditions for having steady state are no longer fulfilled, and the operation of the inverter becomes unstable.

A further desire of the invention is to prevent from crossing zero after $I_{1p}$.

The conversion device in an embodiment of the invention is of the type having transistors, and comprises means for inverting a DC voltage in order to obtain an AC voltage of frequency F, means for filtering the AC voltage, including at least one parallel inductor $L_p$, the device being capable of operating above a resonant frequency. The conversion device comprises means for predicting a zero crossing of the instantaneous current lip in the parallel inductor $L_p$, and means for causing a transistor of the device to switch if a zero crossing of the current lip is predicted. This ensures satisfactory operation in steady state under low load, that is to say close to the resonant frequency, even if some of the components of the conversion device have values slightly different from their rated values.

In one embodiment of the invention, conversion device comprises a means for measuring instantaneous value of the current $I_{1p}$, a means calculating the value of the derivative $I'_{1p}$ of the current $I_{1p}$ with respect to time, a means for calculating the product of the derivative $I'_{1p}$ multiplied by a predetermined period $t_F$, and a means for comparing the instantaneous value of the current $I_{1p}$ and the product $I'_{1p} \times t_F$.

A transistor may thus be turned on again as soon as it is predicted that the current $I_{1p}$ will cross zero within the period $t_F$.

The conversion device may comprise a transformer for measuring the current $I_{1p}$, capable of delivering a voltage $V_1$ representative of the instantaneous value of the current $I_{1p}$, a circuit for differentiating the voltage $V_1$, capable of delivering a voltage $V_2$ representative of the product of the value of the derivative $V'_1$ multiplied by the predetermined period $t_F$, and a circuit for comparing the voltages $V_1$ and $V_2$, the output of the comparator circuit being connected to a device for controlling the switching of the transistors.

In one embodiment of the invention, the converter has double resonance, so that the output current of the converter is a monotonically increasing function of the operating frequency F, which is greater than the resonant frequency $F_p$. The filtering means may comprise a capacitor $C_r$ and an inductor $L_r$ which are arranged in series at the output of the inversion means, the parallel inductor $L_p$ being arranged in parallel with the capacitor $C_r$. according to the principles of the present In one embodiment of the inversion means according to the principles of the present invention, one half-bridge has two transistors, each transistor being provided with a freewheeling diode.

In general, the conversion device comprises a step-upper voltage transformer, the primary of which is supplied by the inversion means, and voltage rectification means connected to the secondary of the transformer.

The method of operation in one embodiment of the invention for a conversion device having transistors, comprising means for inverting a DC voltage in order to obtain an AC voltage of frequency F, means for the AC voltage, including at least one inductor $L_p$ in parallel wherein the zero crossing of the instantaneous current $I_{1p}$ in the parallel inductor $C_r$ is determined, and a transistor of the device is caused to switch at the latest when the zero crossing of the current $I_{1p}$ is predicted.

The prediction of the zero crossing of the current $I_{1p}$ comprises measurement of theinstantaneous value of the current $I_{1p}$, calculation of the derivative filtering $I'_{1p}$ of the instantaneous current $I_{1p}$ with respect to time, calculation of the product of this derivative $I'_{1p}$ multiplied by a predetermined period $t_F$, and comparison of the product with a reference value, the zero crossing of the current $I_{1p}$ being predicted when the product is less than the reference value. This reference value is the current $I_{1p}$.

BRIEF DESCRIPTION OF THE DRAWINGS

The invention will be understood more clearly, and other advantages will emerge from the detailed description of an embodiment, taken by way of entirely non-limiting example and illustrated by the appended drawings, in which.

DETAILED DESCRIPTION OF THE INVENTION

Figure 1:
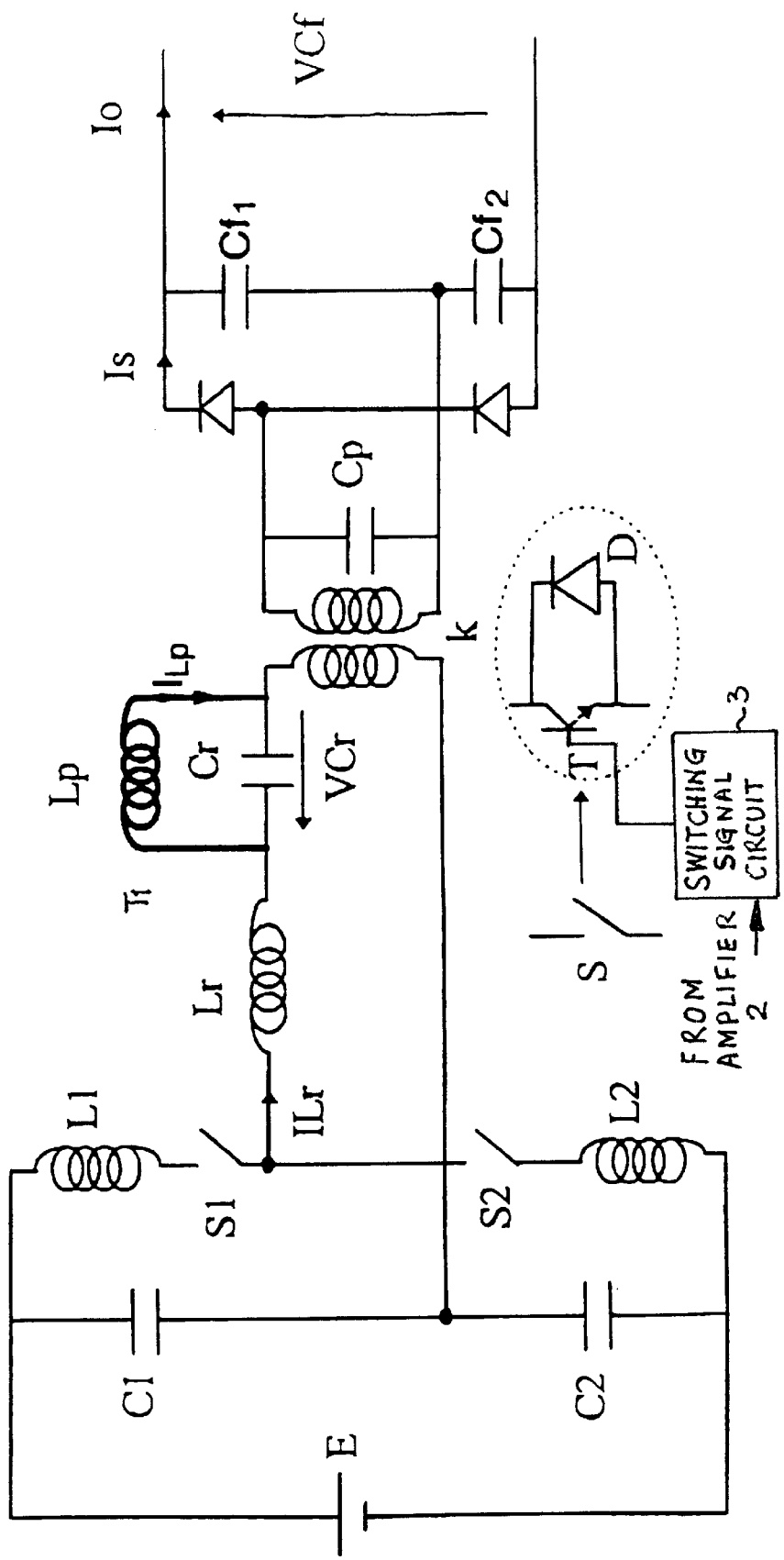
FIG. 1 is a schematic diagram of an energy conversion device.
Figure 2:
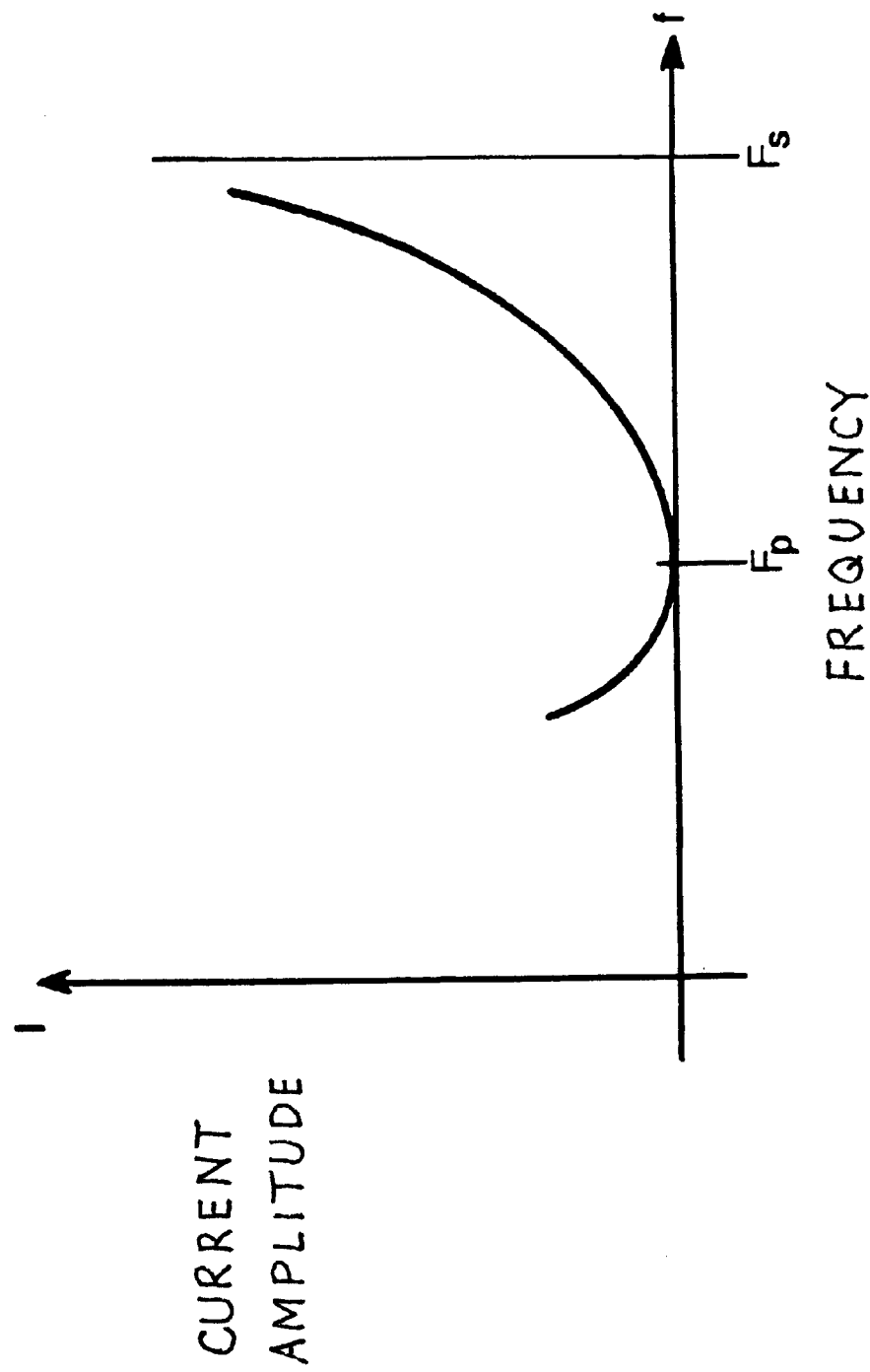
FIG. 2 is a diagram showing the variation in the current delivered to the load as a function of the operating frequency of the inverter.
Figure 3:
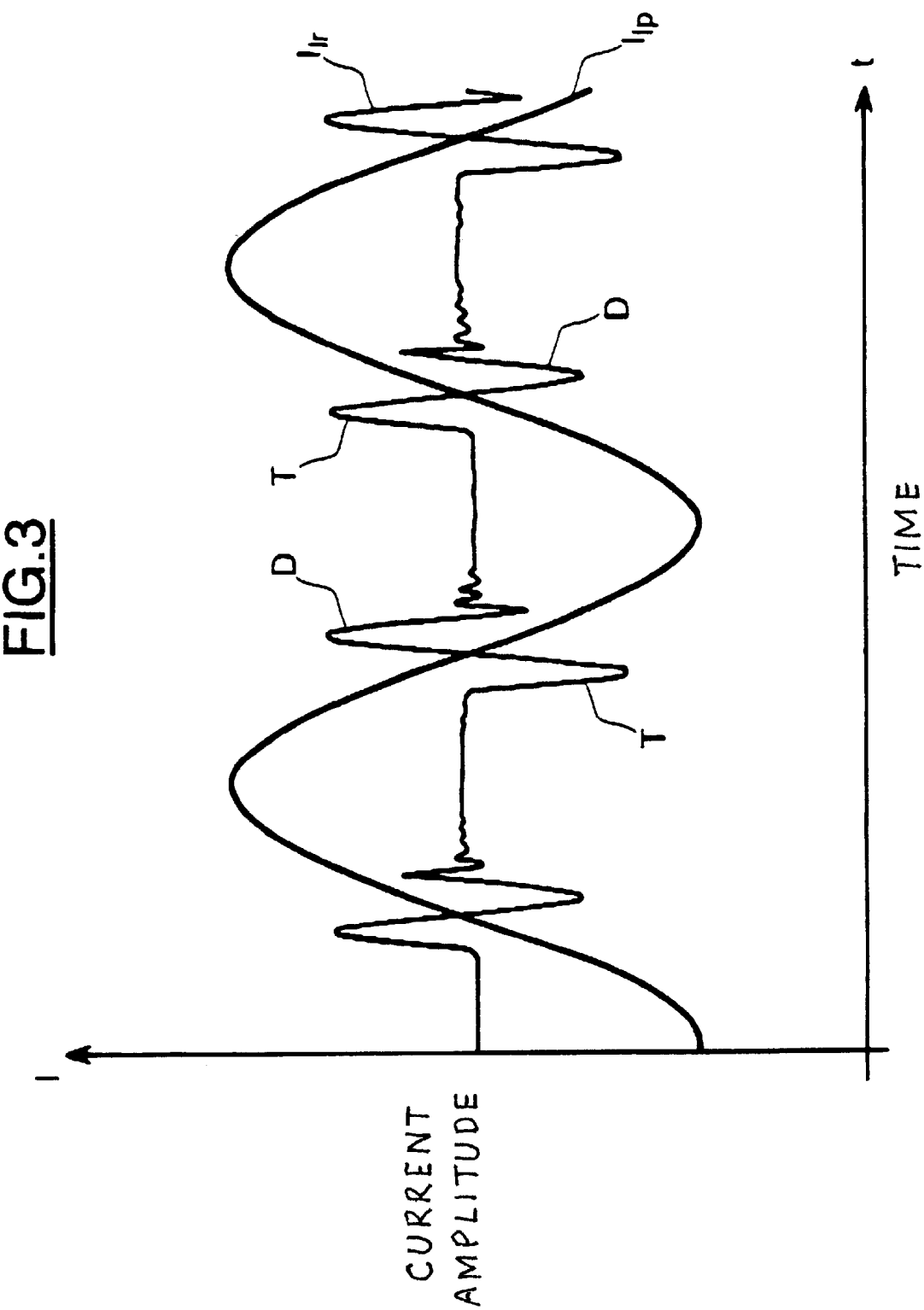
FIG. 3 is a time diagram showing the change in the currents $I_{1p}$ and $I_{1r}$ overtime under no load.
Figure 4:
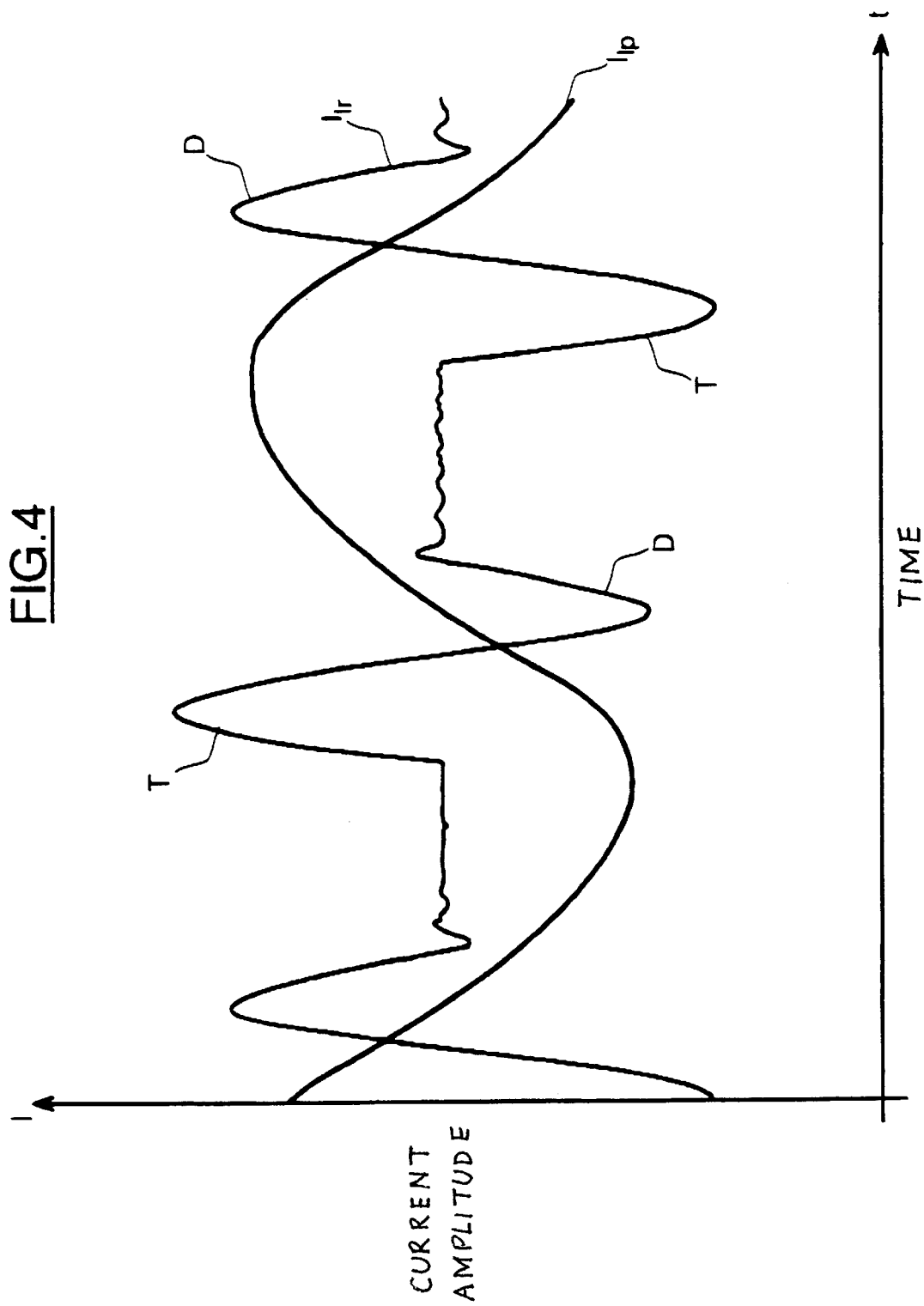
FIG. 4 is a time diagram showing the change in the currents $I_{1p}$ and $I_{1r}$ over time under low load.

In the conversion device as represented in FIG. 1. a parallel resonant frequency $F_p$=20 khz will be chosen in order to be outside the audible spectrum. The conduction time of a transistor T is equal to 4 $\mu$. The choice is therefore made to fix $t_F$ at a value of 4 $\mu$. Thus, as soon as a zero crossing of $I_{1p}$ is predicted within 4 $\mu$, a transistor T is made to turn on, and this will be completed after the 4 $\mu$ period. In consequence, the current $I_{1r}$ reaches a zero value at the same time as the current $I_{1p}$, this being the desired condition for stable operation in steady state.

Figure 5:
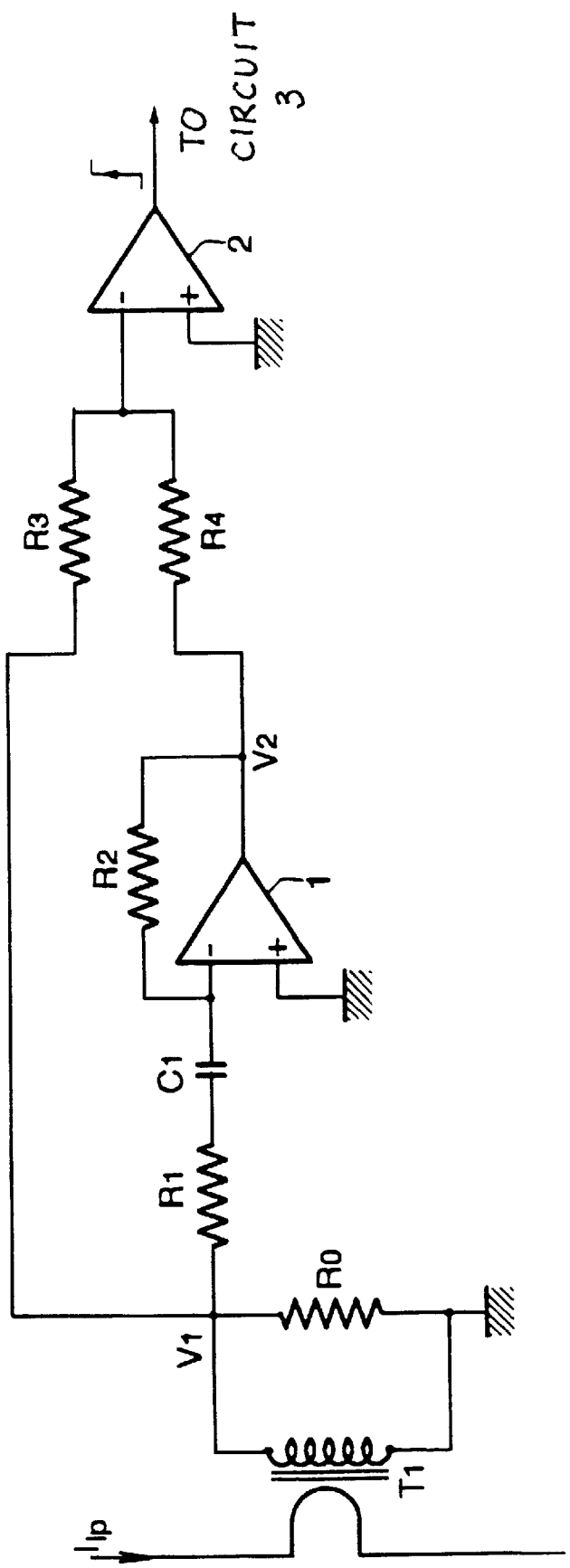
FIG. 5 is a schematic diagram representing the means for predicting the zero crossing of the current $I_{1p}$, according to the invention.

As can be seen in FIG. 5, a transformer T1, for measuring the current $I_{1p}$ is arranged on one of the supply conductors of the coil $L_p$. The transformer T1 is connected to a resistor $R_0$, so that the voltage $V_1$ obtained across the terminals of $R_0$ is proportional to the current flowing in the secondary of the transformer T1, itself proportional to the current $I_{1p}$. The voltage $V_1$ is then delivered to a differentiator circuit comprising a resistor $R_1$ and a capacitor $C_1$ which is in series and is connected to the negative terminal of an operational amplifier 1. This negative terminal is also connected via a resistor $R_2$ to the output terminal of the operational amplifier 1. The positive terminal of the operational amplifier is grounded via a resistor (not shown). The resistor $R_1$, which is small compared with $R_2$, limits the passband and avoids the differentiation of noise present on the circuit.

The voltage $V_2$ obtained at the output of the operational amplifier 1 is therefore proportional to the product of the derivative $V'_1$ of the voltage $V_1$ with respect to time multiplied by the time constant $t'_1$ of the differentiator circuit. This time constant $t_1$ is equal to the product of the resistor $R_2$ multiplied by the capacitor $C_1$. These two components will therefore be chosen such that T1 is equal to 4 $\mu$.

The voltages $V_1$ and $V_2$ are delivered to a comparator circuit comprising an operational amplifier 2 whose negative terminal is connected to the output of the transformer T1 in order to sample the voltage $V_1$ via a resistor $R_3$, and to the output of the operational amplifier 1 in order to sample the voltage $V_2$ via a resistor $R_4$, the value of which is equal to that of the resistor $R_3$. The positive terminal of the operational amplifier 2 is grounded by a resistor (not shown).

The output terminal of the operational amplifier 2 therefore delivers a discrete signal whose state depends on the comparison of the voltages $V_1$ and $V_2$. This signal is sent to the circuit 3 for controlling the transistors, which causes a transistor to be turned on as soon as the voltage $V_1$ becomes less than the voltage $V_2$, which corresponds to the prediction of a zero crossing of the current $I_{1p}$ within 4 $\mu$.

The invention makes available an energy conversion device provided with frequency self-adaptive limitation, which can accommodate inductance and capacitance values subject to vary around their rated values without running the risk of unstable operation of the inverter. As soon as the limitation is triggered, the transistors are tuned on in anticipation, which results in an increase in the operating frequency and thus avoids passing below resonant frequency.

Various modifications in structure and/or function and/or steps may be made by one skilled in the art without departing from the scope and extent of the invention.

What is claimed is:

1. Apparatus for converting DC voltage to AC voltage comprising:
   an inverter for receiving DC voltage and providing unfiltered AC voltage at an operating frequency, said inverter having transistors operable between conductive and nonconductive states;
   filtering means for filtering said AC voltage, said filtering means having at least one resonant circuit formed of a capacitor and a first inductor connected in parallel and possessing a first resonant frequency determined by the values of said capacitor and said first inductor with said first resonant frequency being different from said operating frequency;
   means for measuring current flowing in said filtering means through said first inductor; and
   comparator means responsive to the amplitude of said current to provide an output signal for switching at least one of said transistors from its nonconductive state to its conductive state at a pre-selected time period.

2. The apparatus according to claim 1 wherein said filtering means includes a second inductor connected in series with said capacitor with said second inductor and capacitor possessing a second resonant frequency determined by the values of said capacitor and said second inductor so that the filtering means has a double resonance, whereby the output of the converting apparatus is a monotonically increasing function of said operating frequency, said operating frequency being greater than said first resonant frequency.

3. The apparatus according to claim 1 wherein the filtering means includes a capacitor and an inductor which are arranged in series at the output of the inverter.

4. The apparatus according to claim 1 wherein said inverter includes at least one half-bridge having two transistors, each transistor being provided with a freewheeling diode.

5. The apparatus according to claim 1 further comprising a step-up voltage transformer, having a primary and secondary winding with the primary winding coupled to said inverter and voltage rectification means connected to the secondary winding of the transformer.

6. Apparatus as claimed in claim 1 wherein said preselected time period occurs when said amplitude of said current approaches zero.

7. Apparatus according to claim 1 comprising:
   means for measuring the instantaneous value of said current;
   means for calculating the value of the derivative of said current with respect to time;
   means for calculating a value derived by the product of said derivative of said current multiplied by a predetermined time period; and wherein said comparator means compares the instantaneous value of said current and said value for developing said output signal.

8. The apparatus according to claim 7 comprising a transformer for measuring said current and providing a first voltage representative of the instantaneous value of said current; a circuit for differentiating said first voltage and providing a second voltage representative of the product of said derivative of said current multiplied by said predetermined time period; wherein said comparator means compares said first and second voltages.

9. The apparatus according to claim 8 wherein said filtering means includes a second inductor connected in series with said capacitor and with said second inductor and capacitor possessing a second resonant frequency determined by the values of said capacitor and said second inductor so that the filtering means has a double resonance, whereby the output of the converting apparatus is a monotonically increasing function of said operating frequency, being greater than said first resonant frequency.

10. The apparatus according to claim 8 wherein the filtering means includes a capacitor and an inductor which are arranged in series at the output of the inverter.

11. The apparatus according to claim 7 wherein said filtering means includes a second inductor connected in series with said capacitor with said second inductor and capacitor possessing a second resonant frequency determined by the values of said capacitor and said second inductor so that the filtering means has a double resonance, whereby the output of the converting apparatus is a monotonically increasing function of said operating frequency, said operating frequency said operating frequency being greater than said first resonant frequency.

12. The apparatus according to claim 7 wherein the filtering means includes a capacitor and an inductor which are arranged in series at the output of the inverter.

13. A method of converting DC voltage to AC voltage comprising the steps of:

receiving said DC voltage and providing unfiltered AC voltage at an operating frequency utilizing transistors operable between conductive and nonconductive states;

filtering said AC voltage utilizing a resonant circuit formed of a capacitor and an inductor connected in parallel and possessing a resonant frequency determined by the values of said capacitor and said inductor said resonant frequency being different from said operating frequency;

measuring the amplitude of current flowing through said inductor; and providing an output signal in response to the measured amplitude of said current for switching at least one of said transistors from its nonconductive state to its conductive state at a pre-selected time period.

14. The method according to claim 13 wherein providing said output signal includes the steps of: measuring the instantaneous value of said current; calculating the derivative of said instantaneous current with respect to time; calculating a value derived by the product of this derivative multiplied by a predetermined period and comparing said value with a reference value, said preselected time period occurring when said derived value is less than the reference value.

15. The method according to claim 14 wherein said reference value is said current flowing through said inductor.

16. A method as claimed in claim 13 wherein said pre-selected time period occurs when said amplitude of said current approaches zero.

* * * * *